Dec. 12, 1944.  D. ROEDER ET AL  2,364,662
ENGINE CONTROL
Filed March 29, 1943
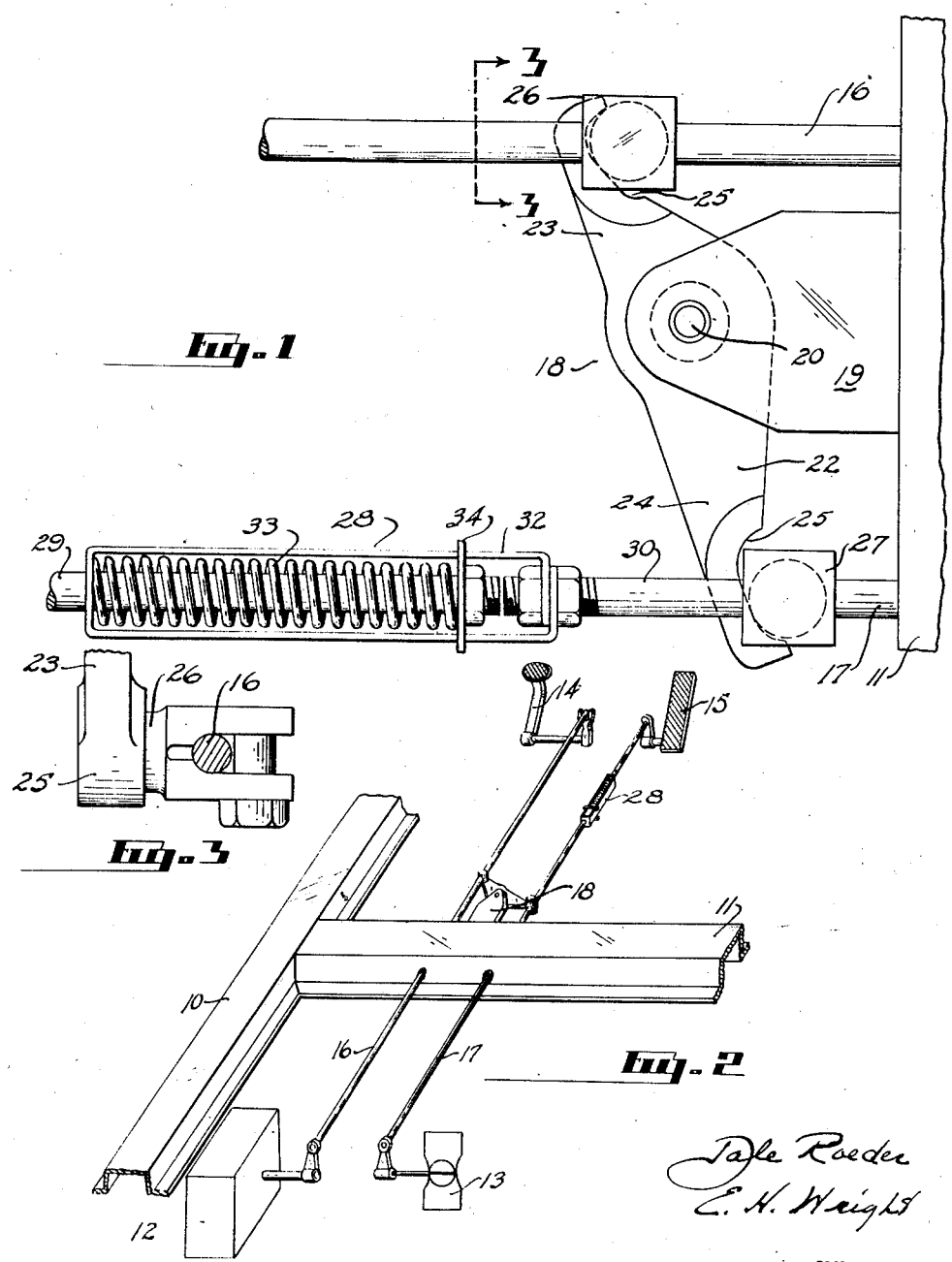
Dale Roeder
E. H. Wright
INVENTORS
BY Edwin C. McRae
R. G. Harris
Attorneys Patented Dec. 12, 1944

2,364,662

UNITED STATES PATENT OFFICE 2,364,662

ENGINE CONTROL

Dale Roeder, Wayne, and Evan H. Wright, Detroit, Mich., assignors to Ford Motor Company, Dearborn, Mich., a corporation of Delaware Application March 29, 1943, Serial No. 480,980

1 Claim. (Cl. 192—.01)

This invention relates to motor vehicles; and, more particularly, to an engine-control interlocking means.

The present invention comprises interlocking means between the clutch and accelerator of motor vehicles and while particularly designed for use in vehicles in which the engine is located remotely from the operator as in buses and rear-engined cars, it finds applications in conventional vehicles as well. In many instances, due to its remote location, the operator does not have the "feel" of the engine obtainable in the more conventional construction. As a result he is not always immediately apprised of its operating condition and hence is liable to stall it under the imposition of load because of insufficient speed, or, on the other hand, engage the clutch when the rotative speed is too high. These conditions are more readily apparent in the conventional car in which the engine is located in immediate proximity to the operator, but when the engine is located at the rear of the car and particularly in busses where extremely long connections are used, it is most difficult to determine the operating condition of the engine at any given moment. Accordingly, bus operators, to prevent the bus stalling while the clutch is disengaged, and as a preliminary to engaging the clutch, have been in the habit of operating the accelerator to drive the engine above maximum torque speed, as high as 3000 R. P. M. Then as the clutch pedal is released the clutch slips considerably before complete engagement, or the motor may be overaccelerated and the clutch slipped to hold down speed. Both of these practices are extremely damaging to the clutch mechanism and contribute to the premature wearing out of clutch facings etc. A principal advantage of this invention is that it controls automatically the relationship between clutch engagement and engine speed. Another advantage is that it permits the operator to maintain the engine at any desired operating condition without relying upon slippage of the clutch to control it. Yet another advantage is that it automatically provides for acceleration of the engine at the precise moment when such acceleration is most needed under conditions of load. Another advantage is that it is entirely automatic in operation and requires no change in approved driving practice, yet is simple, economic in build, and foolproof in operation.

With these and other objects in view, the invention consists in the arrangement, construction and combination of the various parts of the improved device, described in the specification, claimed in the claim, and illustrated in the accompanying drawing in which:

Fig. 1 is a plan view of the interlocking device in this invention.

Fig. 2 is a schematic view of the interlocking hookup as applied to a rear engine motor vehicle.

Fig. 3 is a partial view, taken on the line 3—3 of Fig. 1.

Referring to Fig. 2, a portion of a motor vehicle is shown diagrammatically in which 10 is a frame side member, 11 a frame cross member, 12 the clutch housing and 13 the butterfly valve of the engine carburetor. In the usual position in the driver's compartment located in front of the vehicle are the clutch pedal 14 and the accelerator pedal 15 which are connected with the clutch 12 and the butterfly 13, respectively, through the clutch linkage 16 and the accelerator linkage 17 and it is the arrangement of this linkage which comprises the present invention.

Attention is now directed to Fig. 1 in which the interlock between the two linkages generally designated as 18 is shown on a large scale. This comprises a bracket 19 secured to the frame cross member 11 to which is pivoted at 20 the interlocking lever 22. This lever has clutch and accelerator arms 23 and 24 having sockets 25 at the ends thereof which engage, respectively, stops 26 and 27 on the clutch linkage 16 and accelerator linkage 17. These stops are slidably mounted on their respective linkages, as shown in Fig. 3, so that they may be initially adjusted to conform to the desired range of movement in the control and locked in that position.

Interposed in the accelerator linkage between the accelerator pedal 15 and the accelerator stop 27 is a spring-loaded release 28 joining the forward and rear parts 29 and 30 of the accelerator linkage 17. This comprises a frame 32 secured to the rear part 30 and slidably supporting a crosshead 34 attached to the forward part 29 and a spring 33 normally urging the two parts together. It is thus apparent that the accelerator pedal may be depressed against the spring pressure without having corresponding motion transmitted to the butterfly should any means be interposed to restrict the forward movement of the rear part 30 of the accelerator linkage.

Fig. 1 shows the relation of the parts when the clutch pedal 14 is depressed and the clutch, accordingly, is disengaged. In this position the clutch stop 26 is advanced and carries with it the clutch lever arm 23 of the interlocking lever.

The corresponding movement of the accelerator lever arm 24 brings its socket 25 to the position shown which conforms to that occupied by the stop 27 when the accelerator is set for maximum engine torque output. It follows that should the operator depress the accelerator pedal 15, the accelerator linkage would not be operated beyond the spring-loaded release 28 as the motion of the accelerator linkage would be impeded by the accelerator lever arm 24. However, the accelerator pedal may be depressed against the spring means so that as the operator permits the clutch pedal to rise, re-engaging the clutch, the clutch stop 26 will move to the right, thereby permitting motion of the interlocking lever which, in turn, permits the movement of the rear portion 30 of the accelerator linkage to respond to the spring-load release means and open the butterfly accordingly.

The advantage of this is that once the clutch pedal is depressed and the clutch disengaged, the operator can accelerate the engine above idling speed but not beyond the point of maximum torque output at from 1600 to 1800 R. P. M. during that period. But he may depress the accelerator pedal and thereafter let out the clutch pedal and be sure that the engine is operating at proper speed and that the carburetor will thereafter be opened at exactly the proper time and rate to supply gasoline to the engine to meet the load imposed on it. In other words, instead of alternately accelerating and slipping the clutch to determine the operating conditions, it is only necessary to depress the accelerator while the clutch is disengaged, which has no effect at the moment on the throttle beyond the maximum torque point, and thereafter release the clutch when it is desired to start in motion. The single act of releasing the clutch then actuates the throttle at precisely the time when fuel is required and furthermore controls the rate of throttle application in strict conformity to the rate of clutch engagement. As a result, slippage of the clutch is avoided and at the same time a very close control over the operation of the motor is obtained. It will be noted that the lever arms 23 and 24 are of different lengths as required by the variable amount of travel of the respective linkages and that the stops 26 and 27 are adjustably mounted on the linkage rod so that they can be placed at the precise location desired to give the requisite throttle control between idling and maximum rotative speeds. When the clutch is engaged, the interlock lever 22 no longer has any effect on the movement of the rear part 30 of the accelerator linkage and during this time the accelerator may be operated at will to give whatever throttling effect is desired.

Some changes may be made in the arrangement, construction and combination of the various parts of the improved device without departing from the spirit of the invention and it is the intention to cover by the claim such changes as may reasonably be included within the scope thereof.

The invention claimed is:

In an automotive construction a chassis, an engine mounted thereon, a clutch control means, a throttle control means, connections leading therefrom to a clutch and a throttle respectively, said connections including rigid links spaced in substantial parallelism for at least a portion of their extent, a lever mediately pivoted on said chassis between said parallel links and having its opposite ends adjacent said several links, a stop slidably mounted on each rod, means to secure said stop thereon in adjusted positions, an engaging surface at each end of said lever adapted to engage said stop on the side of said stop nearest said clutch and throttle control means and to permit free movement of said stops away from said last-named means, and a spring-loaded lost motion means interposed in said throttle connection between said throttle control means and the stop on said throttle connection.

DALE ROEDER.
EVAN H. WRIGHT.